Jan. 9, 1968  J. KONIJNENBERG ET AL  3,363,121
LOW-POWER ELECTRIC SHAVER MOTOR

Filed April 2, 1963  2 Sheets-Sheet 1

INVENTOR.
JOHAN KONIJNENBERG
PAUL J. SCHOPHUIZEN
BY

Frank R. Trifari
AGENT 3,363,121
LOW-POWER ELECTRIC SHAVER MOTOR
Johan Konijnenberg and Paul Johan Schophuizen, Drachten, Netherlands, assignors to North American Philips Company, Inc., New York, N.Y., a corporation of Delaware
Filed Apr. 2, 1963, Ser. No. 270,092
Claims priority, application Netherlands, Apr. 3, 1962, 276,752
3 Claims. (Cl. 310—47)

This invention relates to a miniature electric machine, motor and in particular an electric commutator motor for dry-shaving apparatus. Such motors should be as small as possible and assembly should be effected in the simplest possible manner. This means the least possible number of fastening means such as screws, rivets, flanged eyelets and the like should be used.

The machine in accordance with the invention fulfills these requirements and can be assembled by relatively unskilled workers without the use of special tools or other particular auxiliary means.

In order that the invention may readily be carried into effect, it will now be described, by way of example, with reference to the accompanying drawing, illustrating a presently preferred embodiment in which FIG. 1 is a side elevation of an electric collector motor;

Figure 1:
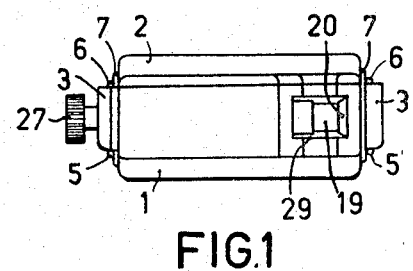
Figure 3:
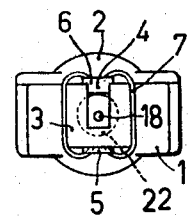
FIG. 3 is an end elevation of the motor shown in FIG. 1.
Figure 2:
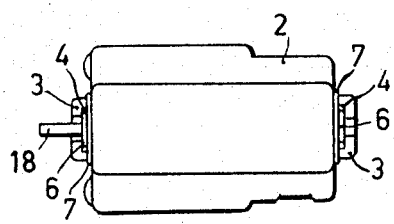
FIG. 2 is a top view of FIG. 1.
Figure 6:
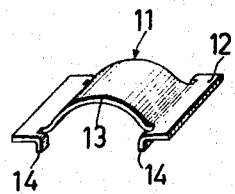
FIG. 6 represents a pole shoe of the motor shown in FIG. 1.
Figure 4:
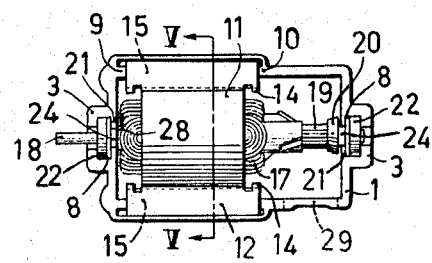
FIG. 4 is a plan view of the motor, as shown in FIG. 2, but of which the cover is removed.
Figure 7:
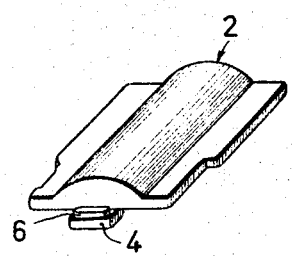
FIG. 7 shows the cover of the motor shown in FIG. 1.
Figure 5:
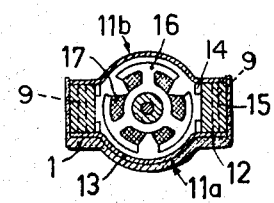
FIG. 5 is a cross-sectional view of FIG. 4 taken along the line II—II, viewed in the direction of the arrow.

In the figures, reference numeral 1 denotes a trough-like housing member of synthetic material of a small electric motor which housing 1 is closed by a cover 2, likewise consisting of synthetic material. At each end the housing has extensions 3; the cover has extensions 4 lying in the extensions 3 and each of them has a lug 6 and 5 respectively. The housing 1 and the cover 2 are connected to each other by means of clamping springs 7 (best seen in FIG. 3) which lie behind the lugs 5 and 6 and which are manufactured of steel wire. The extensions 3 are recessed to define chambers 8 which receive the extensions 4. The housing 1 has integral ribs or stops 9 and 10 extending the depth of the housing 1 and on the bottom between these stops provision is made of a pole shoe 11a. This pole shoe consists of two flat parts 12 and a narrower curved part 13. The pole shoe has on each side of the curved part 13 two lugs 14. On each side of the housing between the wall and the lugs 14, a permanent magnet 15 of FERROXDURE is located. These magnets are held at their upper ends by a second pole shoe 11b, identical to pole shoe 11a, the flat portions 12 of which lie just inside the upright walls of the housing 1. The pole shoes 11a, 11b and the magnets 15 constitute the stator of the motor.

Figures 8, 9:
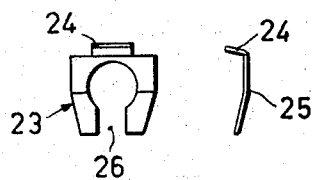
FIG. 8 shows on an enlarged scale a clamping spring.
FIG. 9 is a side elevation of the clamping spring shown in FIG. 8.

The rotor is built up of laminations 16 which are provided with windings 17 and are secured to a shaft 18 in known manner. This shaft 18 has a commutator 19, and a support 20, fabricated out of insulating material, bears on the commutator at one end. This support 20 has the shape of a truncated cone. The chambers 8 accommodate bearings 22 of self-lubricating material which are covered by the extensions 4 of the cover 2. Between the bearings 22 and the walls 21, clamping springs 23 (best shown in FIGS. 8 and 9) are located on either side, which are provided with an upstanding edge 24 and the bodies of which are bent over at 25. These clamping springs 23 have an aperture 26 so they can be slipped over the shaft of the rotor. The clamping springs position the bearings axially. The rotor is further axially fixed at one end by a toothed wheel 27 arranged on the stub shaft 18 projecting beyond the housing, and by a sleeve 28 within the housing 1 provided in known manner between the bearing and the stack of laminations of the rotor.

Figure 12:
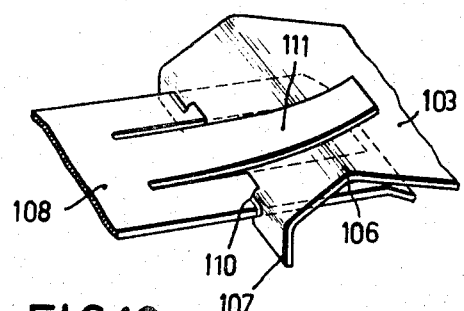
FIG. 12 is a perspective view of a pivotal point of the brush holder shown in FIGS. 10 and 11.
Figure 10:
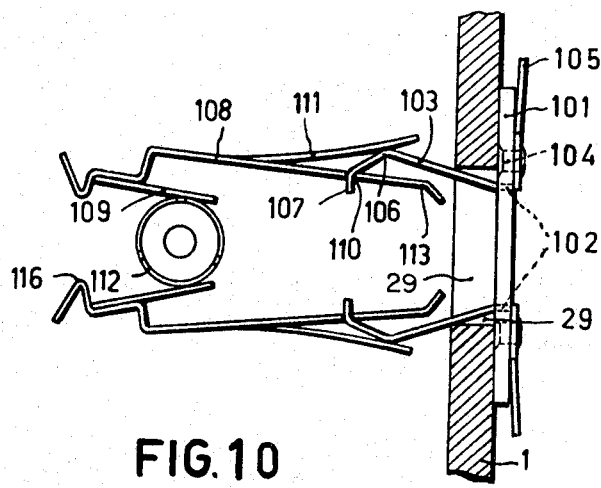
FIG. 10 is a side elevation of a detachable brush holder on an enlarged scale.
Figure 11:
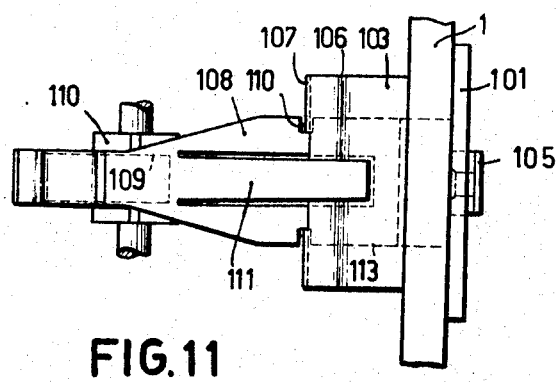
FIG. 11 is a plan view of the brush holder of FIG. 10.

The brush-holder, which is introduced through aperture 29, is shown on an enlarged scale, in FIGURES 10, 11 and 12.

Referring to the latter figures, reference numeral 101 (FIG. 10) designates a rectangular plate of insulating material, which is secured to the motor housing 1 and which has two slotted apertures 102. Each of these apertures accommodates the arms of a bent plate 103, said arms being secured by riveting 104 to the plate 101. Each of the plates 103 has, on its upper side, a tag 105 to which a supply wire (not shown) is soldered. Each plate 103 is notched or recessed at its inner end and bent at 106, (see FIG. 12) so that a lug is formed having at the ends, two further lugs 107. Two arms 108 of resilient copper have each a gauze brush 109, which may be secured to the arm 108 for example by spot welding. The two arms 108 have each two slots 110 accommodating the lugs 107 of the plates 103, so that the assembly 107, 110 constitutes a fulcrum. A spring 111 is pressed out of the material of the arm 108 and is located on the upper side of the lug 106 of plate 103. Thus the brushes 109 are urged against a commutator 112. The arm 108 has an outward prolongation 113. When the gauze brush 109 is worn off, the prolongation 113 comes into contact with the plate 103, so that a further turn of the arm 108 is prevented and the commutator 112 cannot be damaged.

The whole brush holder is passed through an opening 29 in the housing 1 of a small battery-fed electric motor, lugs 116 at the ends of the arms 108 facilitate the passing the commutator 112. The lugs 106 together with the shape of the plates 103 prevent the brush holder from being disengaged unintentionally. It will be seen that the whole brush holder is made from punched parts, so that it is inexpensive. Apart from the rivets 104 there is no rivet or screw whatever, so that the brush holder can be mounted by unskilled persons. As is shown the gauze brushes 109 are only supported at their ends so that the whole structure is extremely suitable for meeting comparatively large commutator-oscillations without the contact between the commutator 112 and the brush being interrupted. This is an important advantage, since a commutator which is completely free of oscillations is difficult to mass produce.

When the brushes 109 are worn off, it is often cheaper to provide a completely new arm 108 with the brush 109 attached thereto than a replacement of the brush. As a matter of course, also carbon brushes may be attached to the arm 108.

It will be evident that the tags 111 may also be separate parts, which can be secured to the arm 108 by riveting or by a scarf joint or spot welding. The arm 108 need not be made of resilient material in this case, but this structure is more costly.

It is evident that the assembling of the motor does not require any screw, rivet or flanged eyelet. The whole brush-holder portion is held by resilient lugs gripping behind the wall of the housing 1. Consequently, the assembling of the motor does not require any special tools either and this assembling may be carried out by unskilled or partly disabled workers.

The described motor is destined for use in a battery operated dry-shaving apparatus, but it is evident that machines operated by alternating current may also be built up in a similar manner.

What is claimed is:

1. A miniature electric motor comprising a generally trough-like housing member having a brush aperture adjacent one end, said housing member having extension means at opposite ends for defining bearing chambers, a rotor having field windings and a rotor shaft having a commutator received wholly within said housing and a stator surrounding said rotor in said housing, rotor bearing means in said bearing chambers supporting said rotor and shaft, said stator consisting of a pair of permanent magnets one at each side of said rotor, a pair of pole shoes of sheet material having means for locating and holding said magnets in operative relation with said rotor, a clamping means in each said chamber engaging said shaft for holding said rotor against axial displacement; a cover member having an extension at each end for engaging and holding said bearings against radial movement, spring clamping means connected with lugs on the housing and cover extensions for connecting said cover and housing, and a discrete unitary brush and holder means received in said housing brush apertures for operative association with said commutator.

2. A miniature electric motor according to claim 1 wherein said brush and holder comprises a pair of discrete opposed arms having a brush attached at one end, each arm having a pivot, and spring means operatively associated with said pivot.

3. A miniature electric motor according to claim 2 wherein each said arm comprises a plate member having a tag, the tag of each arm being fixed to a holder overlying said housing aperture, said plate engaging the housing aperture adjacent the interior wall of said housing, said plate having a bend adjacent the inner end for defining a lug extending toward the opposite arm, a recess in said lug, and an arm portion received in said recess and having slots for receiving said lug, said arm portion having a tongue bearing on a surface of said lug for urging said arm portion toward the said opposite arm, said arm portion having a prolongation for engaging said plate when the brush is worn and before said arm portion engages said commutator.

References Cited

UNITED STATES PATENTS

| | | | |
|---|---|---|---|
| 3,165,654 | 1/1965 | Mabuchi. | |
| 2,453,101 | 11/1948 | Schulz | 310—46 |
| 2,465,446 | 3/1949 | Gorfin | 310—46 |
| 2,978,598 | 4/1961 | Masao Kato. | |

FOREIGN PATENTS 1,117,079  3/1956  France.

MILTON O. HIRSHFIELD, *Primary Examiner.*

J. W. GIBBS, *Assistant Examiner.*